(12) United States Patent
Fey et al.

(10) Patent No.: US 8,412,409 B2
(45) Date of Patent: Apr. 2, 2013

(54) INTEGRATED MICROPROCESSOR SYSTEM FOR SAFETY-CRITICAL REGULATIONS

(75) Inventors: Wolfgang Fey, Niedernhausen (DE); Michael Zydek, Frankfurt (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 1247 days.

(21) Appl. No.: 10/575,213

(22) PCT Filed: Oct. 8, 2004

(86) PCT No.: PCT/EP2004/052477
§ 371 (c)(1), (2), (4) Date: Jul. 2, 2008

(87) PCT Pub. No.: WO2005/036285
PCT Pub. Date: Apr. 21, 2005

(65) Prior Publication Data
US 2008/0258253 A1    Oct. 23, 2008

(30) Foreign Application Priority Data

Oct. 8, 2003 (DE) .................................. 103 47 310

(51) Int. Cl.
*G06F 7/00* (2006.01)
(52) U.S. Cl. ............................. 701/36; 257/500; 714/11
(58) Field of Classification Search .................. 257/500; 714/11
See application file for complete search history.

(56) References Cited

U.S. PATENT DOCUMENTS

| | | | |
|---|---|---|---|
| 5,793,093 A | 8/1998 | Warwick | |
| 6,823,251 B1 * | 11/2004 | Giers | 701/76 |
| 7,389,390 B2 * | 6/2008 | Giers | 711/154 |
| 7,467,035 B2 * | 12/2008 | Sayce-Jones | 701/36 |
| 7,597,336 B2 * | 10/2009 | Karthaeuser et al. | 280/124.157 |
| 7,634,350 B2 * | 12/2009 | Carlton et al. | 701/114 |
| 7,783,814 B2 * | 8/2010 | Lehzen | 710/305 |
| 7,809,449 B2 * | 10/2010 | Esch et al. | 700/21 |

FOREIGN PATENT DOCUMENTS

| | | |
|---|---|---|
| DE | 3234637 | 3/1984 |
| DE | 4137124 | 5/1993 |
| DE | 4341082 | 6/1995 |
| DE | 19529434 | 2/1997 |
| DE | 19716197 | 10/1998 |
| DE | 10053820 | 5/2002 |
| WO | 03050624 | 6/2003 |

* cited by examiner

*Primary Examiner* — Helal A Algahaim

(57) ABSTRACT

Disclosed is an integrated circuit arrangement for safety-critical applications, such as for regulating and controlling tasks in an electronic brake system for motor vehicles. The arrangement includes several electronic, cooperating functional groups (25, 25'), with electric lines (30) provided to interconnect the functional groups (25, 25'). The functional groups consist of a first type and a second type, with the functional groups of the first type having at least the functional group redundant microprocessor system (1) or the functional group input/output devices (19). The functional groups of the second type have at least the functional groups actuator drivers (11, 15, 24, 35) and safety circuits (5, 5', 7, 7'). The functional groups of the first type and the second type are grouped on a joint chip or chip support member (23). The arrangement can be used in electronic brake systems for motor vehicles, in electronic control systems for governing the driving dynamics of motor vehicles, or for controlling electronically controlled parking brakes, or for controlling vehicle restraint systems.

6 Claims, 4 Drawing Sheets

INTEGRATED MICROPROCESSOR SYSTEM FOR SAFETY-CRITICAL REGULATIONS

This application is the U.S. national phase of international application PCT/EP2004/052477 filed Oct. 8, 2004, which designated the U.S. and which claims the benefit of priority of German Patent Application Number 10347310.6 filed Oct. 8, 2003. The contents of each of the aforementioned documents are incorporated herein in their entirety.

BACKGROUND OF THE INVENTION

The present invention relates to an integrated circuit arrangement and its use in electronic brake systems for motor vehicles or in electronic control systems for governing the driving dynamics of motor vehicles or for controlling electronically controlled parking brakes or for controlling vehicle restraint systems such as airbag controls. The integrated circuit arrangement is for safety-critical applications, for regulating and controlling tasks in an electronic brake system for motor vehicles. The arrangement having a plurality of electronic, cooperating functional groups interconnected by electric lines (30. There are functional groups of a first type and a second type, with the functional groups of the first type comprising at least the functional group redundant microprocessor system (1) such as the functional group input/output devices (19), and the functional groups of the second type comprising at least the functional groups actuator drivers (11, 15, 24, 35) and safety circuits (5, 5', 7, 7'). The functional groups of the first type and the second type are grouped on a joint chip or chip support member (23).

Microprocessor systems for safety-critical regulations are disclosed in DE 197 16 197 A1, for example. The microprocessor systems disclosed therein include redundant data processing in order to be appropriate for safety-critical applications such as in ABS or ESP control units. To achieve redundancy, the microprocessor system comprises duplicated functional groups which comprise in each case central units (CPUs), bus systems, and additional functional groups such as memories and input/output components (I/O). Special comparators and bypasses, which perform comparisons of the data, the output data or output signals of the central units, are used to check the proper function of the functional groups.

Among the safety-critical control systems according to the invention are e.g. the control systems which intervene into the brake function of a motor vehicle, being on the market in large quantities and great varieties. Examples of these systems are anti-lock systems (ABS), traction slip control systems (TCS), driving stability control systems (ESP, TCS, DDC, ASMS), chassis control systems, and also control units for parking brakes and restraint systems, etc. For example, failure of an ESP control system would jeopardize the driving stability of the vehicle. For this reason, the operability of the systems is constantly monitored in order to disable the control when a fault occurs ('fault silent') or to switch it over to a condition less dangerous for safety ('fault tolerant').

Monitoring the proper function of integrated circuits is still much more important when they are used in brake systems or motor vehicle control systems where it is not possible to switch over to a mechanical or hydraulic system when the electronics fails. This concerns current brake system concepts such as 'brake-by-wire'. The brake function in such systems depends on an intact electronic circuit so that the microprocessor systems equipped with a fault-tolerant redundancy concept ('fault tolerant') are especially significant for these brake systems.

Another example for a circuit arrangement or a microprocessor system for controlling and monitoring an anti-lock vehicle brake system is disclosed in DE 32 34 637 C2. According to this specification, the input data is sent in parallel to two identically programmed microcomputers and processed synchronously therein. The output signals and intermediate signals of the two microcomputers are checked for concurrence by means of redundant comparators. When the signals differ from each other, the control will be disabled using a circuit which is also designed redundantly. In this prior art circuit arrangement, one of the two microcomputers is used to produce the brake pressure control signals, while the other microcomputer provides the test signals. This means two complete microcomputers, including the associated read-only memories and write-read memories, are required in this symmetrically designed microprocessor system.

According to another system known from the art, based on which the circuit described in DE 41 37 124 A1 is designed, the input data is also sent in parallel to two microcomputers, of which only one microcomputer performs the complete, sophisticated signal processing, however. The second microcomputer is mainly used for monitoring purposes, for what reason the input signals, after having been conditioned, after the formation of time derivatives, etc., can be processed further with the aid of simplified control algorithms and a simplified control philosophy. The simplified data processing is sufficient to produce signals which allow making conclusions with respect to the proper operation of the system by way of comparison with the signals processed in the more sophisticated microcomputer. The use of a test microcomputer of reduced efficiency allows reducing the complexity of manufacture effort compared to a system having two complete sophisticated microcomputers of equal output.

DE 43 41 082 A1 discloses a microprocessor system which is provided in particular for the control system of an anti-lock brake system. This prior art system, which may be accommodated on one single chip, comprises two central units in which the input data is processed in parallel. The read-only memories and the write-read memories connected to the two central units comprise additional storage locations for test information and in each case one generator for generating test information. The output signals of one of the two central units are further processed to produce the control signals, while the other central unit, being the passive one, is only used to monitor the active central unit.

Thus, the necessary safety in the prior art systems mentioned hereinabove is principally reached by redundancy of data processing. In the first case (DE 32 34 637 C2) the system is based on the use of two processors with identical software, being referred to as symmetrical redundancy among experts. In the second case (DE 41 37 124 A1), two processors with different software are used (so-called unsymmetrical redundancy). It is principally also possible to employ one single processor processing the input data based on different algorithms, while additional test algorithms are used then in order to identify fault-free operations.

Eventually, DE 195 29 434 A1 (P 7959) discloses a system of the type mentioned hereinabove which is also referred to as a system with core redundancy. In this prior art microprocessor system, two synchronously operated central units are provided on one chip or on several chips which receive identical input information and execute the same program. As this occurs, the two central units are connected by way of separate bus systems to the read-only memories and the write-read memories as well as to input and output units. The bus systems are interconnected by driver stages or bypasses allowing the two central units to jointly read and process the available data, including test data and commands. The system permits saving storage locations. Only one of the two central units is connected (directly) to a high-value read-only memory and a write-read memory, while the storage capacity of the second processor is limited to storage locations for test data (parity monitoring) in connection with a test data generator. There is access to all data by way of the bypasses. This makes the two central units capable of executing the full program in each case.

The above-described highly integrated and complex safety-critical microprocessor systems have so far not been grouped on a joint chip or chip support member with the components which are active in actuating energy-dissipating consumers such as valve coils for the hydraulic brake pressure control. For this reason, it has previously been necessary to accommodate several integrated circuits (e.g. ICs or separately housed chips, respectively) on one or more conducting path carriers in the electronic controllers for electronic brake systems. Only this way was it possible to realize the failsafe assemblies required for the actual electrohydraulic function (e.g. actuator control, redundant final stages, drivers) as well as for the operation of the microprocessor. In this two-chip system, the first chip comprises the redundant microprocessor system, while the second chip comprises both digital and analog circuit parts (mixed signal) with subassemblies for signal conditioning (signal conditioning), actuator control, and for handling the failsafe functionality e.g. watchdog).

SUMMARY OF THE INVENTION

An object of the invention is to disclose an integrated circuit arrangement which groups the previously separated circuits on one joint chip or chip support member, on the one hand, and is additionally able to reliably detect an individual fault practically whenever this fault appears.

According to the invention, this object is achieved by the integrated circuit arrangement for safety-critical applications, for regulating and controlling tasks in an electronic brake system for motor vehicles. The arrangement having a plurality of electronic, cooperating functional groups interconnected by electric lines (30. There are functional groups of a first type and a second type, with the functional groups of the first type comprising at least the functional group redundant microprocessor system (1) such as the functional group input/output devices (19), and the functional groups of the second type comprising at least the functional groups actuator drivers (11, 15, 24, 35) and safety circuits (5, 5', 7, 7'). The functional groups of the first type and the second type are grouped on a joint chip or chip support member (23).

Thus, the invention is based on the idea of creating a so-called 'single chip EBS system', meaning for example a circuit arrangement for an electronic brake system, which includes only one fault-redundant, highly integrated circuit which is internally protected against faults and external interferences. The circuit arrangement of the invention can therefore be realized practically completely on a piece of a semiconductor substrate (e.g. silicon). This fact allows avoiding the separation of power electronics and highly integrated circuits which is otherwise customary in many cases.

In one embodiment the microprocessor system cross-links the functional groups of the first type, which in particular comprise substantially digital circuit components, and the functional groups of the second type, which substantially comprise analog circuit components for actuating efficient consumers, and in particular the safety circuits in such a fashion that individual safety monitoring of the single functional groups renders possible very high complexity in fault detection and fault tolerance with the aid of the integration of the previously separated integrated circuits as described above. Upon detection of a corresponding fault, preferably, a switch-back to either a so-called safe fallback mode or to another operable functional group with equal function is executed, or the functional group is disabled (fault silent). For example, defined software partial functions of the EBS can still be performed in the reduced scope of functions in the fallback mode, however, other software functions become gradually in-executable depending on the level of the fallback mode. The circuit includes in particular several fallback modes of this type, e.g. in the order of ESP, TCS, ABS, with the number of the operative circuit elements decreasing from the left to the right.

In order to enhance safety still further, protection zones are preferably designed in the regions between the individual separately de-activatable functional groups of the integrated circuit arrangement. For example, a corresponding protection zone can be a region of the integrated circuit arrangement which is preferably very high-ohmic compared to the environment and is used as isolation against total failures of the various functional groups (ICs) on the chip. It is this way possible to keep faults such as overvoltage, electrostatic voltages (ESD), overloading, restricted to one functional group so that the damages caused by the fault will not lead to any damage in the functional groups in the vicinity of the damaged functional group. This permits ensuring a safe switchover into the safe mode by the respectively other, still operative part.

The protection zones are favorably configured as guard rings or trenches (for example deep-trenches). Likewise a combination of these two isolation methods may be expedient in special cases.

The integrated circuit arrangement of the invention defines a microcontroller which comprises practically all necessary analog circuits so that these previously separated functional units are positioned on one joint chip or chip support member. The employed chip or chip support member is advantageously composed of a semiconductor material such as silicon or germanium.

The layout of the circuit of the invention is preferably such that there are as few conducting connections as possible between the individual functional groups and a smallest possible number of line crossovers. This way, even the otherwise great number of necessary or optionally existing buffer structures is reduced. To reach this goal, it is particularly suitable to employ an improved routing method as described in patent application PCT/EP0200416. The method described in this patent application which is preferred for the manufacture of the integrated circuit arrangement of the invention will arrange for a layout using an automated method in which at least two logically separated partial systems (functional groups) are provided, while beside the logical isolation, a spatial (physical) isolation of the partial systems on the available area of the circuit arrangement is realized in addition.

The functional groups being arranged in pairs or existing several times on the joint chip or chip support member, such as monitoring circuits, voltage monitoring arrangements, watchdog, etc., are advantageously connected electrically to each other and/or to an actuator in such a fashion that in each case the failure of one functional group is observed by the other functional group belong to the pair and/or by a component connected to both functional groups belonging to the pair (e.g. actuator driver). It is this way possible to disable the corresponding actuator driver e.g. when there is a malfunction in the line connections of the two circuits.

Thus, the number of components is favorably reduced by the invention, whereby above all an improved failure rate and reliability is achieved in addition to lower costs.

Further preferred embodiments can be seen in the subsequent description of the Figures.

DETAILED DESCRIPTION OF THE DRAWINGS

Figure 1:
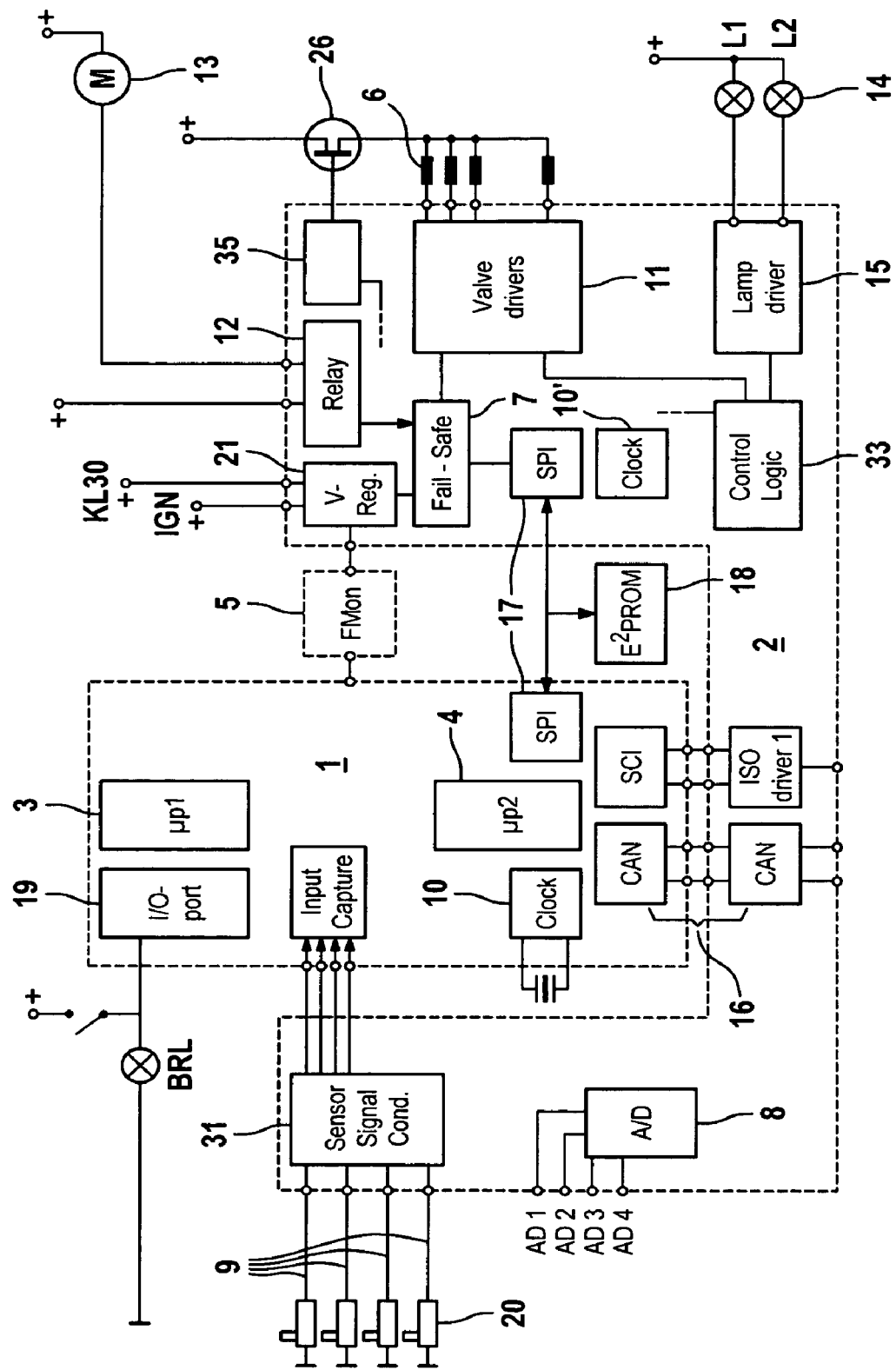
FIG. 1 shows a circuit arrangement of control electronics according to the state of the art.

The circuit arrangement in FIG. 1 comprises all necessary functional groups of a safety-optimized, per se known universal ABS, TCS and ESP control unit which is employed many times in up-to-date motor vehicles. The dotted lines represent isolated areas 1, 2, and 5. They symbolize three isolated, separately housed integrated circuits (chips) which are arranged on a joint conducting path carrier (not shown).

The functional groups necessary for the operation are, among others, an integrated microprocessor system 1 which is arranged in a first chip, an integrated power electronics 2 arranged in a second chip, and a safety circuit 5. The microprocessor system 1 essentially comprises a first microprocessor 3 and a second microprocessor 4. Failsafe module 7 is provided beside chip 1 in order to monitor chips 1 and 2.

In chip 2 the final stages drivers 11 for actuating the solenoid valves 6 are grouped. Further, the circuit arrangement comprises at the input end an A/D converter 8, a sensor signal conditioning unit 31 which is connected to wheel rotational speed sensor inlet 9 and wheel speed sensors 20. Further, there are grouped oscillators 10, 10', relays 12 for switching pump motor 13, warning lamp drivers 15 to actuate warning lamps 14, CAN-driver 16, SPI-driver 17, EEPROM 18, input/output ports 19, voltage controller 21, as well as redundant electronic switch elements 26 to disable the valve coils 26 (MD).

Figure 2:
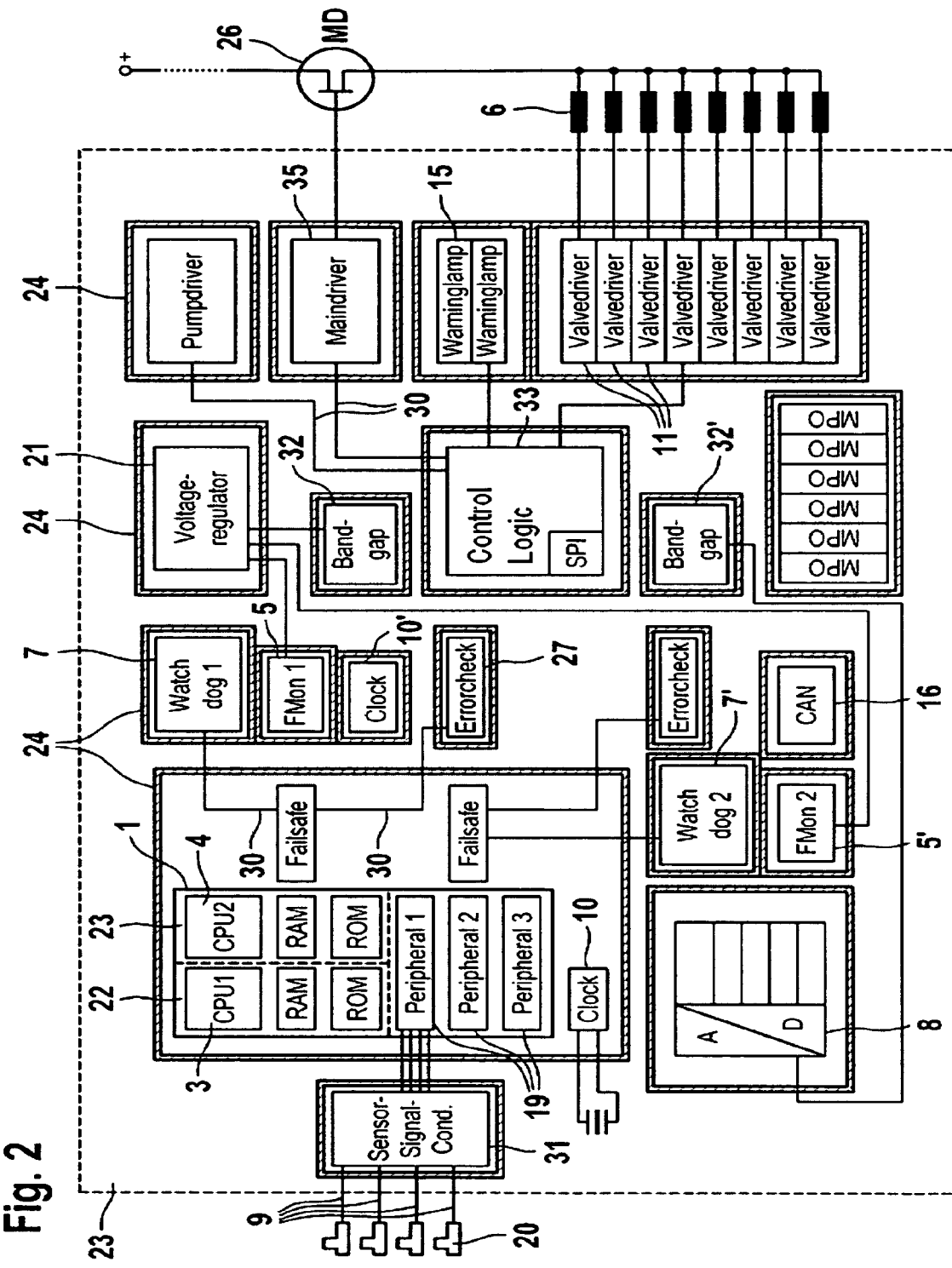
FIG. 2 shows a circuit arrangement for an example of a microcomputer system.

FIG. 2 depicts an example for a microcontroller 23 of the invention which includes the special feature that all functional groups for a driving dynamics control system (for ABS, ESP, etc.) are arranged on one joint silicon chip 23 as a so-called 'single chip' system. Principally, the functional groups always concern independent integrated circuits. Microcontroller 23 comprises a redundant microprocessor system 1 with a first microcomputer 22 and a second microcomputer 23 being connected to each other by way of a non-illustrated serial or parallel data bus, depending on the existing redundancy concept (core redundancy, symmetrical redundancy, asymmetrical redundancy). By way of this data bus, the microcomputers are able to exchange data for checking their correct functioning, or to activate each other in a case of malfunction, or to disable themselves or the entire system, respectively.

Microcontroller 2 further comprises the functional groups A/D converter 8, valve driver (PWM or digital) 11, general signal processing unit 31 for sensors (in particular wheel sensors and/or pressure sensors), warning lamp driver 15, voltage supply 21, safety circuit 5, 5', 7, 7', 27 such as watchdog or functional groups for the purpose of voltage monitoring of the external operating voltages (FMon), redundant voltage references 32, 32' (e.g. band gap references), actuation logic 33 for the power driver stages.

The functional groups which have been described in the preceding paragraph and will be illustrated in FIGS. 3 a) and b) once more in an enlarged view using the example of two functional groups are isolated from each other by isolation zones 24 such as guard rings or trenches in such a fashion that defective circuit components will not take any influence on neighboring function blocks. Besides, the functional groups are arranged on the chip preferably in such a manner that redundant functions are spaced from each other physically (spatially and/or electrically) on the chip to the greatest extent possible. This circumstance prevents any interaction of the structurally identical groups due to a malfunction, being caused e.g. by thermal overload or ESD intervention.

Figure 3A:
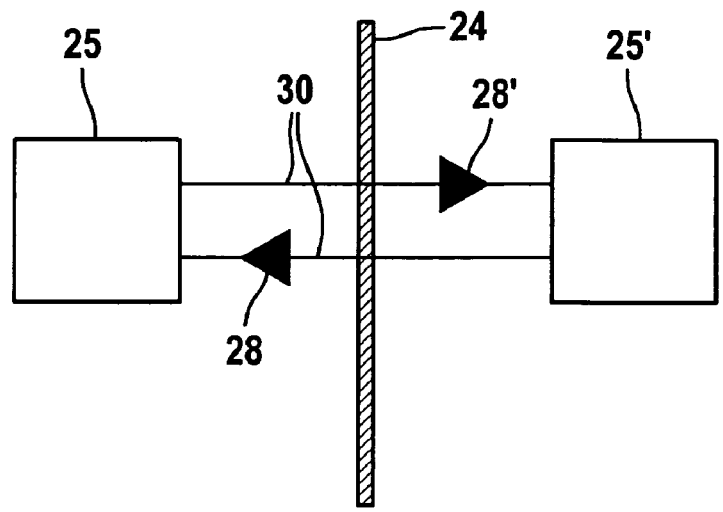
FIGS. 3a and 3b schematic views of an example of realizing line passages between separate function blocks in the circuit arrangement of FIG. 2.
Figure 3B:
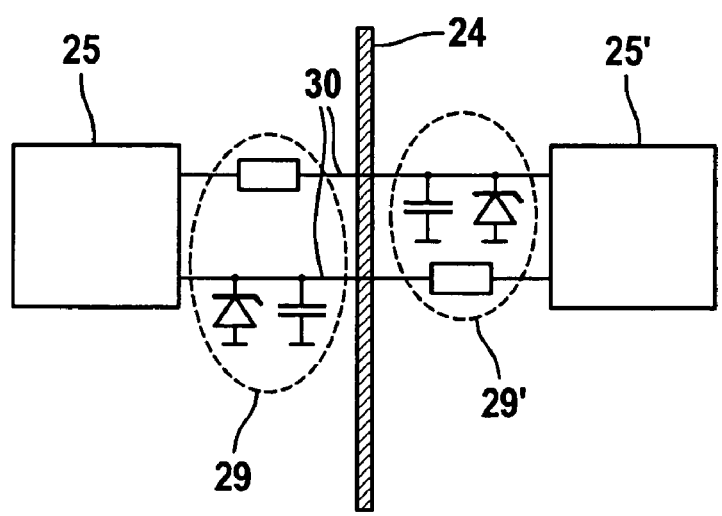

FIG. 3 shows in a principle view two electrically interconnected functional groups 25 and 25' which are isolated from each other by isolation zones 24. The electric lines 30 interconnect the function blocks and, for this purpose, extend like bridges over the isolation zones 24. To avoid shortcomings in terms of safety due to a line connection, there is an additional electric separation of the functional groups. Therefore, the lines 30 are designed in such a way that upon the occurrence of a fault of functional group 25, no reaction to the functional group 25' or vice-versa is possible. Unidirectional buffers 28, 28' (FIG. 3a) or ESD protective structures 29, 29' (FIG. 3b) are inserted into the lines to this effect.

Figure 4:
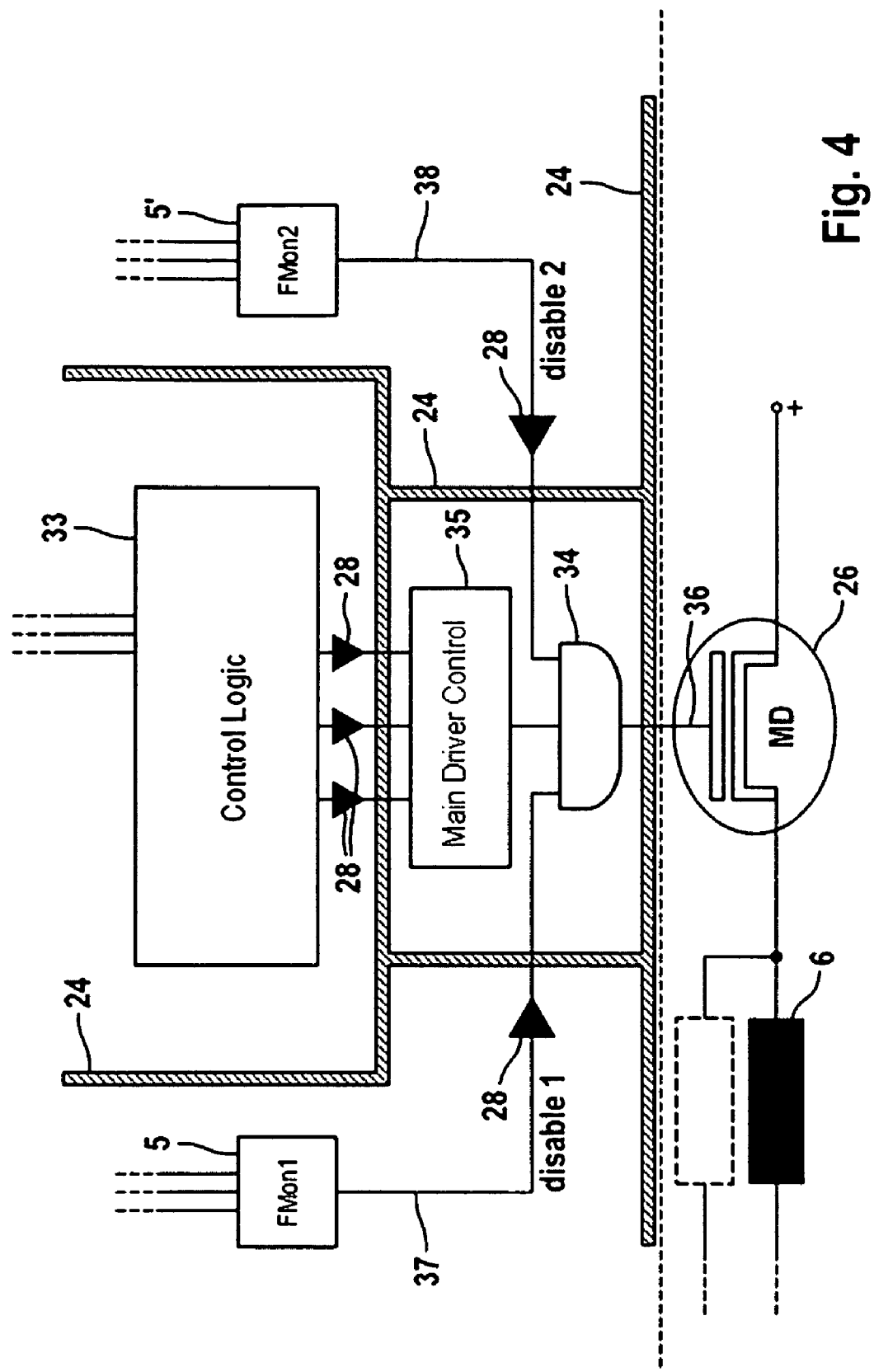
FIG. 4 is a schematic view of an example for the design of the circuit arrangement in the area of a valve driver (MD).

Referring to FIG. 4, the area of the chip surface 23 is illustrated on which the monitoring circuits 5 and 5' (FMon for monitoring the operating voltage) mentioned in FIG. 2 are arranged. Corresponding to the example in FIG. 3b) a line 38 is provided which leads via protective structure 24 and comprises a buffer 28. Monitoring circuit 5 is connected to AND gate 34 by way of line 37. Accordingly, the redundant monitoring circuit 5' is connected to AND gate 34 by way of line 38. Another input of the AND gate is connected to the driver actuating electronics 35 to actuate the main driver 26 (MD).

If, for example, malfunction occurs in the line connections of the two circuit arrangements 5 and 5', no electric signal is applied to the signal line 36 when the main driver 26 is actuated by the main driver actuation control 35. In this case, a signal prevails at line 36 only if a signal is applied to all inputs of the AND gates. Failure of a monitoring circuit 5 or 5' or any fault detected by this circuit, respectively, will thus cause blocking of the main driver 26 and, hence, disabling of the valve 6.

The invention claimed is:

1. An integrated circuit arrangement for safety-critical applications, for controlling tasks in an electronic brake system for motor vehicles, comprising:
   a plurality of electronic, cooperating functional groups (25, 25');
   a plurality of electric lines (30) provided to interconnect the functional groups (25, 25'), wherein the functional groups includes groups of a first type and second type, with the functional groups of the first type comprising a functional group redundant microprocessor system (1) and the functional group input/output devices (19), and the functional groups of the second type comprising the functional groups actuator drivers (11, 15, 24, 35) and safety circuits (5, 5', 7, 7'), and with the functional groups of the first type and the second type being grouped on a joint chip or chip support member (23);
   wherein the functional groups are protected against one another at least partly by isolated areas, wherein the isolated areas are doped guard rings or etched barriers such as trenches or deep trenches; and wherein the microprocessor system cross-links the functional groups of the first type, which comprise substantially digital circuit components, and the functional groups of the second type, which substantially comprise analog circuit components for actuating efficient consumers, and in particular the safety circuits in such a fashion that individual safety monitoring of the single functional groups is rendered possible.

2. The integrated circuit arrangement according to claim 1, wherein the redundant microprocessor system is a core-redundant microcontroller system or a microcontroller system with a symmetrical redundancy or a microcontroller system with asymmetrical redundancy.

3. The integrated circuit arrangement according to claim 1, wherein the electric lines (30) leading from a first functional group (25) to a second functional group (25') are protected by at least one of buffer element(s) (28) or ESD protective structures (29, 29') against fault-producing events of the neighboring functional group(s) and/or against fault-producing outside influences.

4. The integrated circuit arrangement according to claim 3, wherein the electric lines include the buffer element or the ESD protective structure on at least one or on each side of an isolated area.

5. The integrated circuit arrangement according to claim 1, wherein part of the functional groups is redundantly designed two times or more times (5, 5'), and in the event of malfunction of the redundantly designed functional group (5), another equal functional group (5') assumes the function of the faulty functional group, and signal lines (37, 38) and logic components (34) are provided for this purpose which either cause disabling of the faulty function (fault silent) or ensure switchover of the function to the faultlessly functioning functional group (5') (fault tolerant).

6. The integrated circuit arrangement according to claim 1, wherein circuit arrangement is provided in electronic brake systems for motor vehicles or in electronic control systems for governing driving dynamics of motor vehicles, or for controlling electronically controlled parking brakes, or for controlling vehicle restraint systems such as airbag controls.

* * * * *